United States Patent
Nishida et al.

(10) Patent No.: US 7,265,657 B2
(45) Date of Patent: Sep. 4, 2007

(54) LANE BOUNDARY DETECTOR

(75) Inventors: Makoto Nishida, Toyota (JP); Akihiro Watanabe, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 168 days.

(21) Appl. No.: 11/135,438

(22) Filed: May 24, 2005

(65) Prior Publication Data

US 2005/0273260 A1 Dec. 8, 2005

(30) Foreign Application Priority Data

Jun. 2, 2004 (JP) ............................. 2004-164939

(51) Int. Cl.
*B60Q 1/00* (2006.01)
(52) U.S. Cl. ............... 340/436; 340/435; 340/903; 382/103; 382/104; 701/36; 701/301
(58) Field of Classification Search ............ 340/436, 340/435, 437, 988, 903; 180/168; 382/103, 382/104, 291; 348/169, 118; 701/1, 36, 701/45, 301
See application file for complete search history.

(56) References Cited

U.S. PATENT DOCUMENTS 5,890,083 A * 3/1999 Franke et al. ............ 701/45
6,449,383 B1 * 9/2002 Oike et al. ............... 382/104
6,493,458 B2 * 12/2002 Yasui et al. .............. 382/104
6,577,334 B1 6/2003 Kawai et al.
6,850,628 B2 * 2/2005 Shirato .................. 382/104
7,016,517 B2 * 3/2006 Furusho ................. 382/103

FOREIGN PATENT DOCUMENTS

| EP | 1 605 404 A2 | 12/2005 |
|---|---|---|
| JP | A-08-320997 | 12/1996 |
| JP | A-2001-014595 | 1/2001 |
| JP | A 2002-312797 | 10/2002 |

* cited by examiner

Primary Examiner—Davetta W. Goins
(74) Attorney, Agent, or Firm—Oliff & Berridge, PLC (57) ABSTRACT

A boundary detector includes a candidate line detecting unit that detects a candidate line of a lane boundary position drawn on the road surface based on image information from a camera. The detector also includes a lane boundary position selecting unit that selects the lane boundary position based on the candidate line; an additional lane boundary position selecting unit that selects a lane boundary position of an additional lane that is added to a main lane based on the candidate line; and an additional processing unit that stops adopting the lane boundary position for a predetermined time period when the additional lane boundary position selecting unit selects a lane boundary position of the additional lane.

10 Claims, 6 Drawing Sheets

LANE BOUNDARY DETECTOR

BACKGROUND OF THE INVENTION

1. Field of the Invention

The present invention relates to a boundary detector and a boundary detecting method that acquire image information based on an image supplied from a camera that is mounted on a vehicle and picks up an image of a road surface, and detect a boundary drawn on the road surface based on the acquired image information.

2. Description of the Related Art

In recent years, an apparatus has been developed for picking up an image of a road surface in front of a vehicle with a camera, detecting a boundary, i.e., a white line, drawn on the road surface based on the image picked up by the camera, and automatically driving the vehicle on a lane delineated by the white line. For the realization of automatic driving, the lane must be properly detected, in other words, a detector is required for processing the image picked up by the camera to detect the lane, i.e., the white lines. Such detectors are disclosed in Japanese Patent Applications Laid-Open Nos. H08-320997, and 2001-014595, for example.

A vehicle lane detector disclosed in Japanese Patent Application Laid-Open No. H08-320997, measures a maximum value of edge point counts of an edge component that represents a straight line component, based on image information on the right and the left sides of the vehicle and immediately in front of the vehicle. The vehicle lane detector, based on the measured maximum value, recognizes that the image belongs to a dotted lane marker when the maximum value changes periodically, and that the image belongs to a solid lane marker when the maximum value remains constant. Thus, the vehicle lane detector recognizes the lane of the vehicle based on the results of recognition of the right and the left lane markers.

Another vehicle lane detector disclosed in Japanese Patent Application Laid-Open No. 2001-014595, detects white line candidate points through processing of an image captured by a video camera attached to a front part of a vehicle. The vehicle lane detector selects only the white line candidate points that are determined to be a part of a white line among all the white line candidate points, to calculate a detection ratio, and determines a type of the white line based on the detection ratio.

On a bypass highway, for example, a plurality of main lanes is provided together with additional lanes such as a lane for right turn or a lane for left turn to allow a vehicle to turn right or left at an intersection ahead of the vehicle. With the lanes for right turn and left turn, an overall road width widens and white lines that mark the lanes are drawn so as to bend from the white line of the main lane to outward. When there is a right turn lane added to the main lane on which a vehicle runs, for example, a white line detector may mistakenly detects the white line of the right turn lane as the white line of the main lane. The white line detector is required to correctly determine whether the detected white line belongs to the main lane or to the right turn lane. Above described two patent applications do not particularly disclose techniques to prevent such inconvenience and therefore are not immune to detection error of the white lines delineating the lanes.

SUMMARY OF THE INVENTION

In view of the foregoing, an object of the present invention is to solve the above-described problem and provide a boundary detector which can properly distinguish a main lane and an additional lane to guide a vehicle along a proper lane.

A boundary detector according to one aspect of the present invention includes a camera that is mounted on a vehicle and picks up an image of a road surface; a candidate line detecting unit that detects a candidate line of a lane boundary position drawn on the road surface based on image information of the image supplied from the camera; a lane boundary position selecting unit that selects the lane boundary position based on the candidate line of the lane boundary position detected by the candidate line detecting unit; an additional lane boundary position selecting unit that selects a lane boundary position of an additional lane that is added to a main lane based on the candidate line of the lane boundary position detected by the candidate line detecting unit; and an additional processing unit that stops adopting the lane boundary position selected by one of the lane boundary position selecting unit and the additional lane boundary position selecting unit for a predetermined time period when the additional lane boundary position selecting unit selects a lane boundary position of the additional lane.

The additional processing unit adopts the lane boundary position prior to the selection of the lane boundary position of the additional lane when the additional lane boundary position selecting unit selects the lane boundary position of the additional lane.

The additional lane boundary position selecting unit recognizes the detected lane boundary position as the lane boundary position of the additional lane one of (i) when a road curvature calculated based on the lane boundary position is larger than a first predetermined value and (ii) when a pitch angle is out of a predetermined range and the road curvature is larger than a second predetermined value smaller than the first predetermined value.

The predetermined time period where it is stopped to adopt the lane boundary position selected by one of the lane boundary position selecting unit and the additional lane boundary position selecting unit is a time period in which the vehicle moves by a predetermined distance from a lane position of the vehicle at a time the additional lane boundary position selecting unit selects the lane boundary position of the additional lane.

The additional lane is one of a right turn lane to guide the vehicle to turn right and a left turn lane to guide the vehicle to turn left at an intersection ahead along the main lane, and the predetermined time period in which it is stopped to adopt the lane boundary position selected by one of the lane boundary position selecting unit and the additional lane boundary position selecting unit is a time period until the intersection is detected.

According to the boundary detector, the candidate line of the lane boundary position drawn on the road surface is detected based on the image information acquired from the image supplied from the camera, and the lane boundary position is selected based on the candidate line of the lane boundary position. Besides, the lane boundary position of the additional lane that is added to the main lane is selected. Upon selecting the lane boundary position of the additional lane, the boundary detector stops adopting the lane boundary position selected by one of the lane boundary position selecting unit and the additional lane boundary position selecting unit over the predetermined time period. Thus, since the boundary detector stops adopting the selected lane boundary position over the predetermined time period when the lane boundary position of the additional lane is selected, the boundary detector can properly distinguish the main lane from the additional lane to guide the vehicle along the correct lane without being affected by the lane boundary position of the additional lane, whereby a continuous and appropriate driving of the vehicle is allowed.

A boundary detecting method according to another aspect of the present invention includes detecting a candidate line of a lane boundary position drawn on a road surface based on image information of an image supplied from a camera that is mounted on a vehicle and that picks up the image of the road surface; selecting the lane boundary position based on the candidate line of the detected lane boundary position; selecting a lane boundary position of an additional lane that is added to a main lane based on the candidate line of the detected lane boundary position detected; and stopping adopting one of the lane boundary positions for a predetermined time period when a lane boundary position of the additional lane is selected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, an exemplary embodiment of a boundary detector according to the present invention is described in detail with reference to the accompanying drawings. The present invention is not limited by the embodiment.

Figure 1:
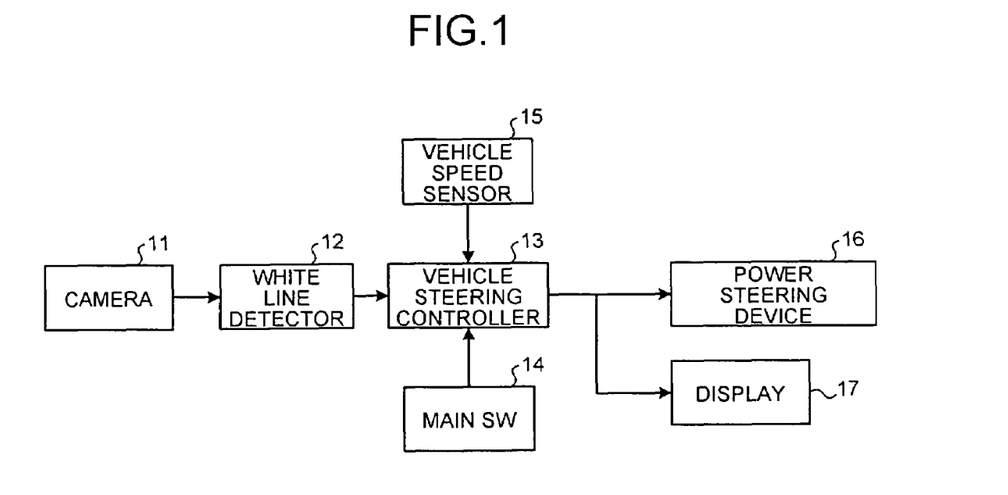
FIG. 1 is a block diagram of a structure of a vehicle controller to which a boundary detector according to an embodiment of the present invention is applied.
Figure 2:
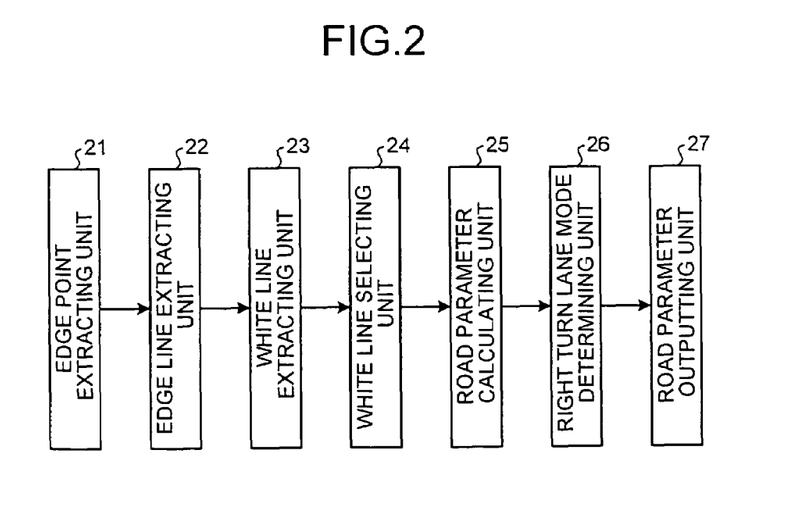
FIG. 2 is a block diagram of a structure of the boundary detector according to the embodiment.
Figure 3:
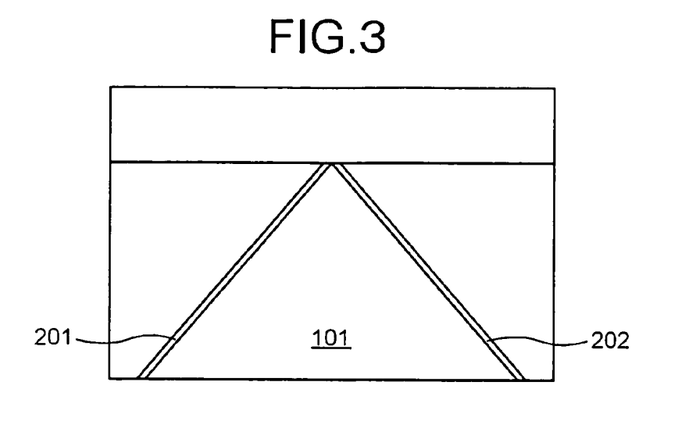
FIG. 3 is a schematic diagram of an image that is picked up by a camera.
Figure 4:
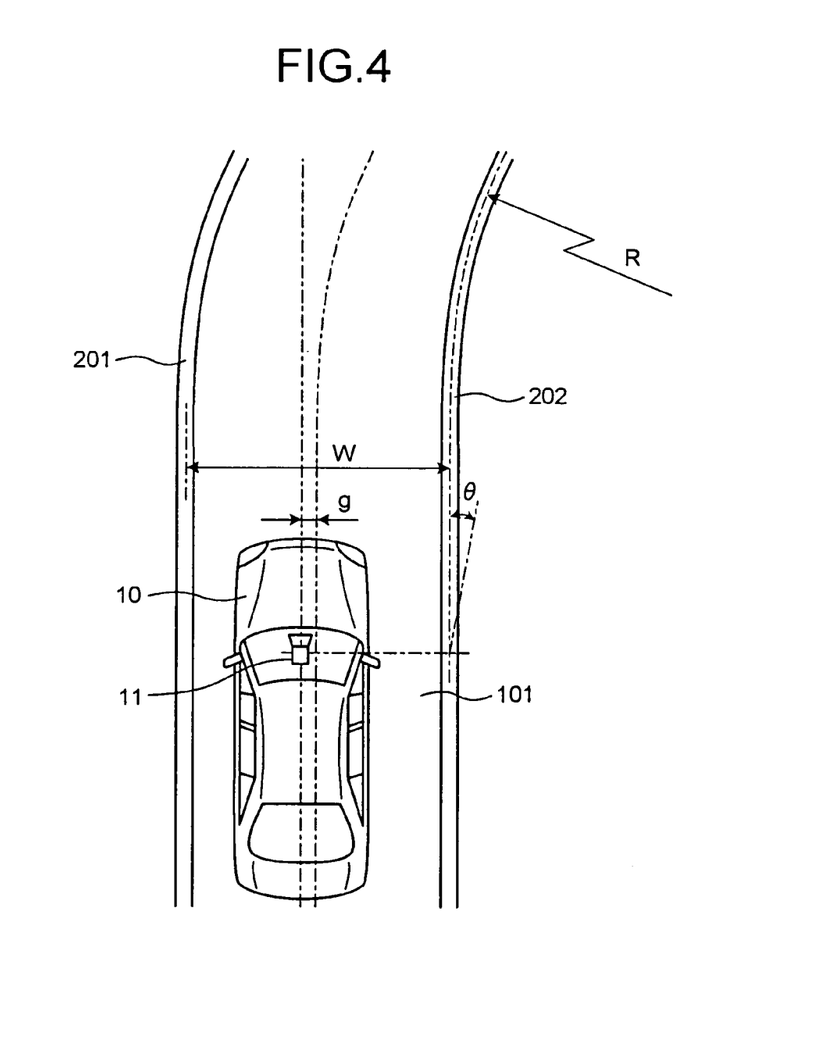
FIG. 4 is a schematic diagram of road parameters supplied as outputs from the boundary detector of the embodiment.
Figure 5:
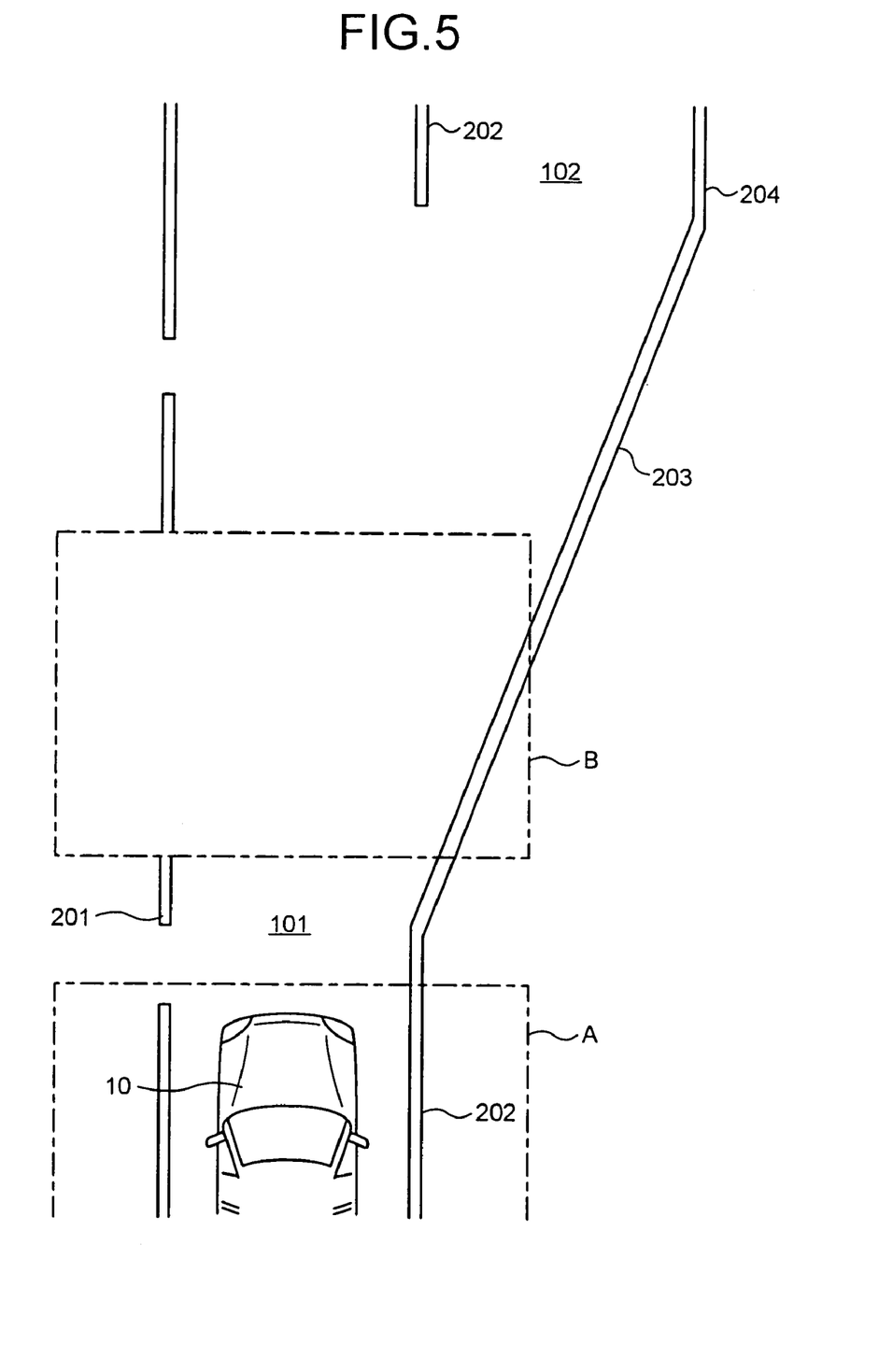
FIG. 5 is a plan view of a road that includes a main lane and a right turn lane.
Figure 6A:
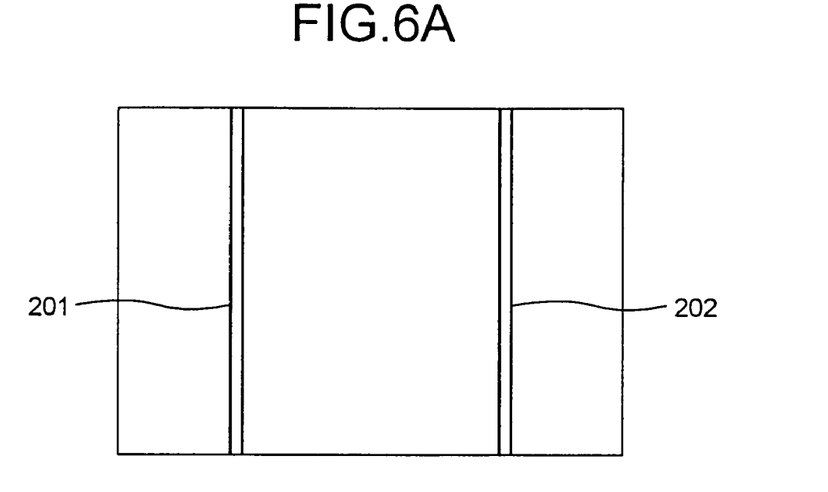
FIG. 6A is a schematic diagram of the main lane after an image processing.
Figure 6B:
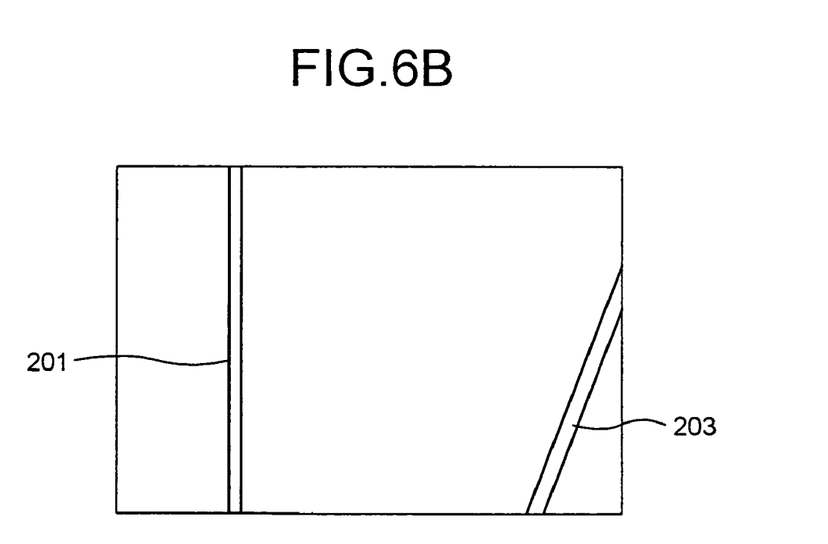
FIG. 6B is a schematic diagram of an additional section in the main lane after the image processing.
Figure 7:
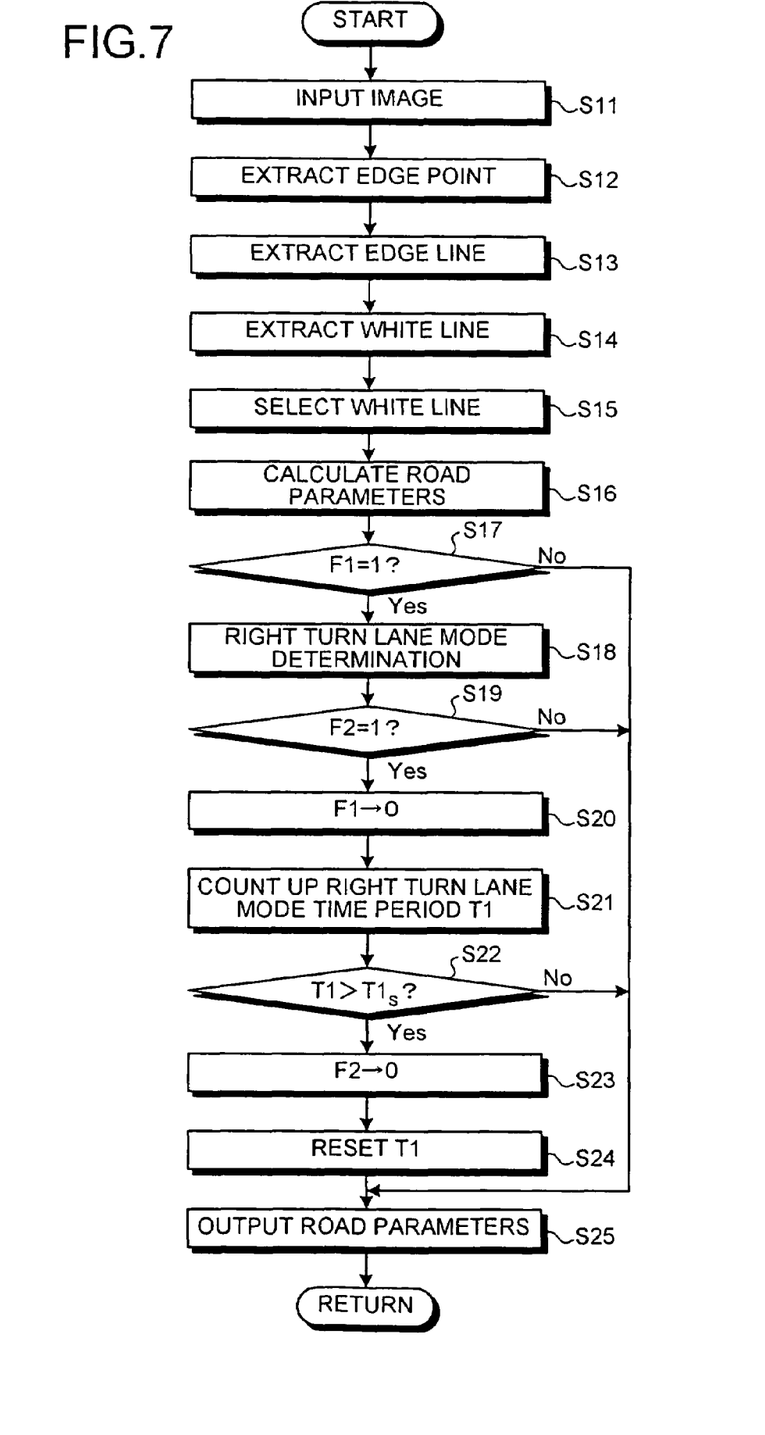
FIG. 7 is a flowchart of a boundary detection control by the boundary detector according to the embodiment.
Figure 8:
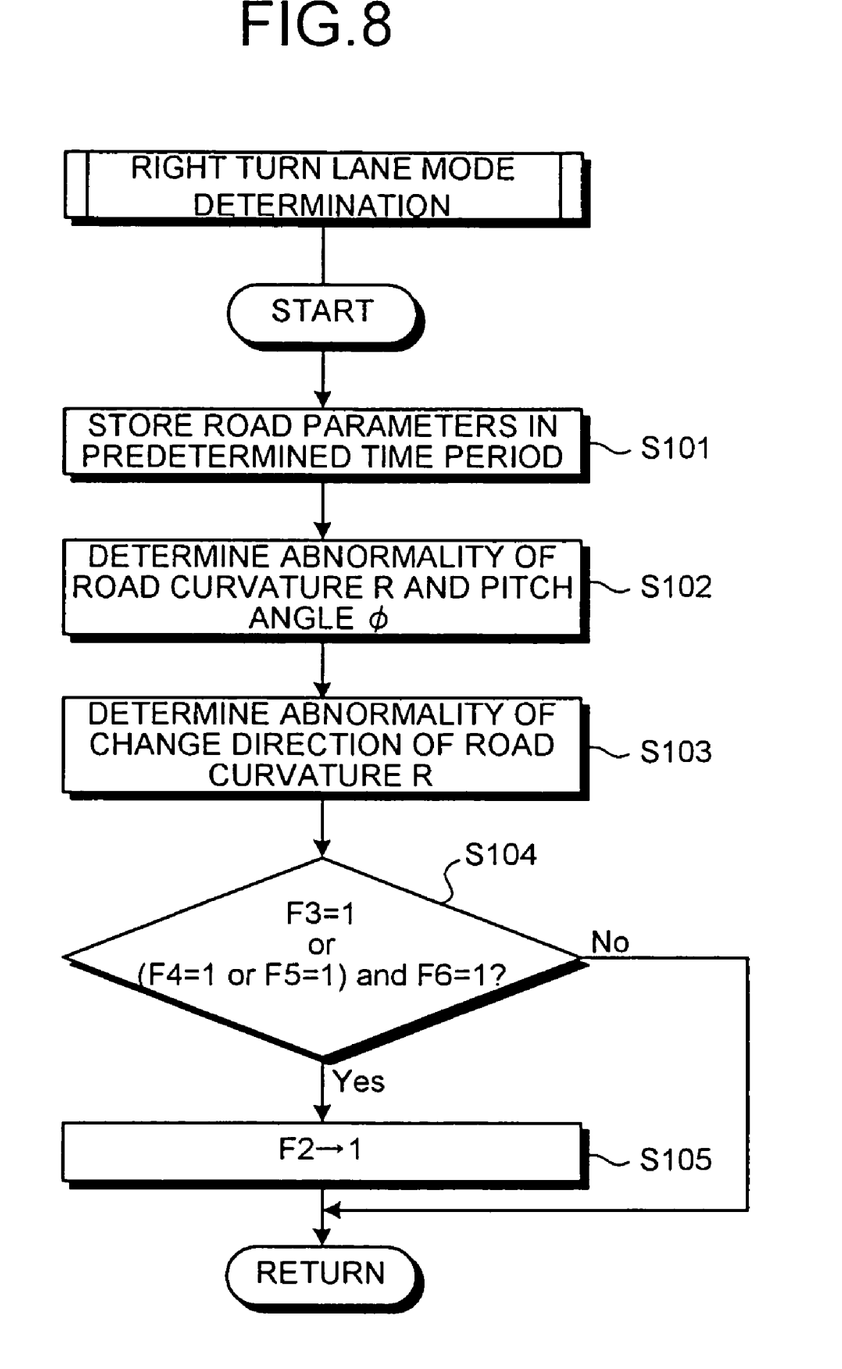
FIG. 8 is a flowchart of a right turn lane mode determination process.

FIG. 1 is a block diagram of a structure of a vehicle controller to which a boundary detector according to the embodiment of the present invention is applied, FIG. 2 is a block diagram of a structure of the boundary detector of the embodiment, FIG. 3 is a schematic diagram of an image picked up by a camera, FIG. 4 is a schematic diagram of road parameters which are supplied as outputs from the boundary detector of the embodiment, FIG. 5 is a plan view of a road including a main lane and an right turn lane, FIG. 6A is a schematic diagram of the main lane after an image processing, FIG. 6B is a schematic diagram of an additional section of the main lane after the image processing, FIG. 7 is a flowchart of a boundary detection control by the boundary detector of the embodiment, and FIG. 8 is a flowchart of a right turn lane mode determination process.

The vehicle controller to which the boundary detector of the embodiment is applied includes, as shown in FIG. 1, a camera 11, a white line detector (boundary detector) 12, a vehicle steering controller 13, a main switch (S/W) 14, a vehicle speed sensor 15, a power steering device 16, and a display 17. The vehicle controller detects white lines on both sides of a lane on which the vehicle is running, calculates road parameters based on the white lines, and steers the vehicle based on the road parameters to properly drive the vehicle within the lane on which the vehicle is currently running.

The camera 11 is fixed at a predetermined angle of depression near a room mirror, for example, to capture an image of the road in front of the vehicle, and outputs a captured image to the white line detector 12. The camera 11 is capable of capturing an image within a range from a position predetermined distance away from the front of the vehicle up to a far position. In the image, as shown in FIG. 3, right and left white lines (boundary lines) 201 and 202, that delineate a lane 101, merge at an upper section of the image to form a reverse V shape.

The white line detector 12 detects the right and the left white lines drawn on the road surface based on the image supplied from the camera 11, and finds the road parameters based on the information of the right and the left white lines. The white line detector 12, as shown in FIG. 2, includes an edge point extracting unit 21 that serves as a candidate line detector, an edge line extracting unit 22, a white line extracting unit 23, a white line selecting unit 24 that serves as a lane boundary position selecting unit, a road parameter calculating unit 25, a right turn lane mode determining unit 26 that serves as an additional lane boundary position selecting unit and as an additional processing unit, and a road parameter outputting unit 27. The white line detector 12 conducts various processing on a planar image of the road viewed from above which is obtained through a geometric transform of the image picked up by the camera 11.

The white line detector 12 continuously processes the image supplied from the camera 11 at a predetermined sampling cycle (200 ms, for example) and recognizes a point where the brightness changes sharply along a horizontal direction, i.e., the right and left direction of the camera 11, that is perpendicular to the direction of vehicle driving, as an edge point. The edge point extracting unit 21 extracts a plurality of edge points from the image supplied from the camera 11. The edge line extracting unit 22 extracts a plurality of edge lines that are white line candidate lines (candidate lines for the lane boundary positions) through Hough transform, for example, from the plurality of edge points extracted by the edge point extracting unit 21. The white line extracting unit 23 extracts plural sets of white line candidate lines, each set consisting of a pair of left line and right line, from the plurality of edge lines extracted by the edge line extracting unit 22. Then the white line selecting unit 24 selects two or one white line which is most likely to be a vehicle lane from the plural sets of white line candidate lines extracted by the white line extracting unit 23.

The road parameter calculator 25 calculates five road parameters, i.e., a road curvature R, a pitch angle of the vehicle $\phi$, a yaw angle $\theta$, a lane width W, and an offset g based on the two selected white lines. As shown in FIG. 4, when the vehicle 10 is running on the lane 101 delineated by left and right white lines 201 and 202, the road curvature R is an average of the curvatures of the left and the right white lines 201 and 202, and takes a positive value when the lines bend rightward of the running direction of the vehicle 10 and takes a negative value when the lines bend leftward of the running direction of the vehicle 10. The pitch angle $\phi$ is an inclination angle of the vehicle, i.e., an angle formed by an optical axis of the camera 11 with respect to the road surface, and is calculated based on the inclination angles of the left and the right white lines 201 and 202 after the transform into the planar image. Provided that the pitch angle $\phi$ is zero when the vehicle 10 stops in a parallel state with the road surface, the left and the right white lines 201 and 202 in the planar image are parallel with each other. On the other hand, when the front part of the vehicle tilts downwards, the left and the right white lines 201 and 202 in the planar image come to take a shape of a reverse V, whereas when the front part of the vehicle tilts upwards, the left and the right white lines 201 and 202 in the planar image come to take a shape of V. Hence, the pitch angle $\phi$ can be calculated based on the angles of the white lines 201 and 202. The yaw angle $\theta$ is an average value of a deflection angles of the left and the right white lines 201 and 202 with respect to the driving direction of the vehicle 10 viewed from a fixed position of the camera 11, and takes a positive value when the deflection is rightward of the vehicle 10 and a negative value when deflection is leftward of the vehicle 10. The lane width W is a distance between the left and the right white lines 201 and 202. The offset g is a shift between the center of the road 101 and the center of the vehicle 10, and takes a positive value when the vehicle 10 shifts rightward on the lane 101 and takes a negative value when the vehicle 10 shifts leftward on the lane 101.

The right turn lane mode determining unit 26 selects a white line of a right turn lane that is added to a right side of a main lane from the plural sets of white line candidate lines extracted by the white line extracting unit 23 (as the additional lane boundary position selecting unit), sets a right turn lane mode upon selection of the white line of the right turn lane, to stop adopting the white line selected by the white line selecting unit 24 thereafter for a predetermined time period (as the additional processing unit).

Generally on the bypass highway, for example, to provide a right turn lane 102 to the main lane 101, which is delineated by the left and the right white lines 201 and 202, for allowing the vehicle to turn right at an intersection ahead, an inclined white line 203 diverting rightward from the right white line 202 and a right turn white line 204 which is lead and bent leftward from the inclined white line 203 and becomes parallel with the white line 202 are drawn, and the white line 201 does not continuously form a corresponding part to the inclined white line 203 as shown in FIG. 5. When the vehicle 10 is running on a road where the right turn lane 102 is provided on the right side of the main lane 101, and the white line detector 12 conducts an image processing on an image captured by the camera 11 in a process area A, two parallel white lines 201 and 202 can be detected as shown in FIG. 6A. On the other hand, when the white line detector 12 conducts the image processing on the image captured by the camera 11 in a process area B, though the left side white line 201 can be detected, the right side white line 202 cannot be detected and instead the inclined white line 203 which delineates the right turn lane 102 is detected as shown in FIG. 6B. Hence, the vehicle 10 may not be properly driven along the main lane 101 on which the vehicle is currently running.

Hence, the right turn lane mode determining unit 26, on determining that one of two white lines selected from the plural sets of white line candidate lines extracted by the white line extracting unit 23 is the inclined white line 203 of the right turn lane 102, does not adopt the road parameters calculated based on the data of the selected inclined white line 203 and instead adopts the road parameters calculated based on data of the previously selected white lines, i.e., the white lines 201 and 202 of the main lane 101. In this case, the selected white line is determined to be the white line of the right turn lane when the road curvature R calculated by the road parameter calculating unit 25 is larger than a first predetermined value or the pitch angle $\phi$ of the vehicle calculated by the road parameter calculating unit 25 is out of a predetermined range and the road curvature R is larger than a second predetermined value which is smaller than the first predetermined value.

Further, when the selected white line is determined to be the white line of the right turn lane, a process mode is switched from a normal lane mode to a right turn lane mode. In the normal lane mode, a white line candidate line is recognized as a white line if the white line candidate line is continuously detected many times (ten times, for example) within a predetermined detection time period (one second, for example). On the other hand, in the right turn lane mode, a white line candidate line is similarly recognized as a white line if the white line candidate line is continuously detected many times (ten times, for example) within a predetermined detection time period (one second, for example). However, the adoption of information of the selected white line is stopped for a predetermined time period. Thus, after the vehicle 10 passes through the section connected to the inclined white line 203 of the right turn lane 102 on the main lane 101, the white line of the main lane 101 can be detected again.

The road parameter outputting unit 27 serves to output to the vehicle steering controller 13, the road parameters such as the road curvature R, the pitch angle $\phi$ of the vehicle, the yaw angle $\theta$, the lane width W, and the offset g, calculated by the road parameter calculating unit 25, and the road parameter outputting unit 27 also outputs the results of determination by the right turn lane mode determining unit 26 about the inclined white line 203 to the vehicle steering controller 13.

In addition, the vehicle steering controller 13 sets an amount of steering (steering torque) of the vehicle based on the road parameters supplied from the white line detector 12. In other words, the vehicle steering controller 13, when the lane on which the vehicle 10 is running turns to the right, determines the amount of steering necessary for the vehicle to run through the curve and controls the power steering device 16. The vehicle steering controller 13 is connected to the main switch 14 and controls the steering of the vehicle 10 when the main switch 14 is turned ON. In addition, the vehicle steering controller 13 is connected to the vehicle speed sensor 15. The vehicle steering controller 13 sets the amount of steering of the vehicle in consideration of the vehicle speed detected by the vehicle speed sensor 15. The display 17 connected to the vehicle steering controller 13 displays a control state.

Next, with reference to the flowcharts of FIGS. 7 and 8, the white line detection control conducted by the white line detector of the embodiment as described above will be described.

In the white line detection control by the white line detector 12 of the embodiment, as shown in FIG. 7, the white line detector 12 receives an image from the camera 11 at step S11, extracts the plurality of edge points based on the input image from the camera 11 at step S12, extracts the plurality of edge lines via Hough transform of the extracted plurality of edge points at step S13, extracts the plural sets of white line candidate lines from the extracted plurality of edge lines at step S14, and selects two white lines which are most likely to be lane signs from the plural sets of white line candidate lines at step S15. At step S16, the white line detector 12 calculates the road curvature R, the pitch angle $\phi$ of the vehicle, the yaw angle $\theta$, the lane width W, and the offset g as the five road parameters based on the two selected white lines.

At step S17, the white line detector 12 determines whether a detection flag F1=1 (ON). In the normal lane mode control, when the white line of the lane is detected, the detection flag F1=1 (ON), whereas when the white line is not detected since the white line drawn on the road surface is erased or cannot be seen because of the covering snow, the detection flag F1=0 (OFF). When the detection flag F1 is not 1 at step S17, the process moves to step S25, whereas when the detection flag F1=1 at step S17, the process moves to step S18 to execute a determination control of the right turn lane mode.

As shown in FIG. 8, at step S101, the road parameters (the road curvature R, the pitch angle $\phi$ of the vehicle, the yaw angle $\theta$, the lane width W, and the offset g) of a predetermined time period (five seconds, for example) are stored in a past history buffer. Then, at step S102, an abnormality determination is conducted with the road curvature R and the pitch angle $\phi$ of the road parameters. First, an average RA of the road curvature R and an average $\phi_A$ of the pitch angle $\phi$ in a predetermined past time period (five seconds, for example) are calculated. Then, it is determined whether a difference between the current road curvature R and the past average RA is larger than a first threshold value RB or not. In addition, it is determined whether a difference between the current pitch angle $\phi$ and the past average $\phi_A$ is larger than a first threshold value $\phi_B$ and whether a difference between the current pitch angle $\phi$ and the past average $\phi_A$ is smaller than a second threshold value $\phi_S$. Here, the first threshold value $\phi_B$ is set larger than the second threshold value $\phi_S$. If the difference between the current road curvature R and the past average RA is larger than the first threshold value RB, it can be assumed that the lane on which the vehicle is currently driving makes an extremely big curve toward the right or the left, and a road curvature abnormal flag F3 is set to one. If the difference between the current pitch angle $\phi$ and the past average $\phi_A$ is larger than the first threshold value $\phi_B$, it can be assumed that the angle formed by the left and the right white lines is extremely large and the left and the right white lines form a reverse V shape on the planar image, since the pitch angle is large regardless of the absence of forward tilt of the vehicle, and a pitch angle first abnormal flag F4 is set to one. Further, if the difference between the current pitch angle $\phi$ and the past average $\phi_A$ is smaller than the second threshold value $\phi_S$, it can be assumed that the angle formed by the left and the right white lines is extremely large and the left and the right white lines form a V shape on the planar image, since the pitch angle is small regardless of the absence of backward tilt of the vehicle, and a pitch angle second abnormal flag F5 is set to one. The abnormality determination with the road curvature R and the pitch angle $\phi$ can be briefly summarized as follows:

$R-R_A>R_B \rightarrow F3=1$ $\phi-\phi_A>\phi_B \rightarrow F4=1$ $\phi-\phi_A>\phi_S \rightarrow F5=1$ After the abnormality determination of the road curvature R and the pitch angle $\phi$ of the road parameters at step S102, an abnormality determination of change direction of the road curvature R of the road parameters is performed at step S103. In other words, it is determined whether the difference between the current road curvature R and the past average RA is larger than the second threshold RS which is smaller than the first threshold RB. If it is determined that the difference between the current road curvature R and the past average RA is larger than the second threshold RS, it can be assumed that the current lane makes a rightward curve and a right turn road curvature flag F6 is set to one.

$R-R_A>R_S \rightarrow F6=1$

Then, at step S104, a right turn lane mode determination is performed based on the flags F3 to F6 set as described above. In other words, when the road curvature abnormal flag F3=1, or the pitch angle first abnormal flag F4=1 or the pitch angle second abnormal flag F5=1 and the right turn road curvature flag F6=1, it is determined that the detection result of the white line is a detection error caused by the presence of a right turn lane. When it is determined to be the detection error caused by the right turn lane, the process moves to step S105 where the right turn lane mode flag F2 is set to one (ON). On the other hand, if the detection result of the white line is determined not to be the detection error caused by the right turn lane at step S104, the right turn lane mode flag F2 is not changed.

F3=1 or (F4=1 or F5=1) and F6=1→F2=1

Thus, in the determination control in the right turn lane mode, it is determined whether the selected white line is the white line of the right turn lane 102 or not based on the calculated road curvature R and the pitch angle $\phi$ of the vehicle. When the selected white line is determined to be the white line of the right turn lane 102, the right turn lane mode flag F2 is set to one. When the right turn lane mode flag F2 is determined to be zero, the detection flag F1 is set to one. Thus, the road parameters calculated based on data of the selected white line of the right turn lane 102 is not adopted for a predetermined time period.

Returning to FIG. 7, in the determination control in the right turn lane mode, after it is determined whether the selected white line is the white line of the right turn lane 102 or not, and the right turn lane mode flag F2 is set, at step S19 it is determined whether the right lane mode flag F2 is one or not. If the selected white line is determined not to be the white line of the right turn lane 102 in the above described right turn lane mode determination control at step S19 the right turn lane mode flag F2 is set to zero. Hence, the process moves to step S25 in which the calculated road parameters including the road curvature R of the main lane 101, the pitch angle $\phi$ of the vehicle, the yaw angle $\theta$, the lane width W, and offset g, and the state of the detection flag F1 (F1=1 or F1=1) are supplied as outputs to the vehicle steering controller 13. On the other hand, when the selected white line is determined to be the inclined white line 203 of the right turn lane 101 in the above described right turn lane mode determination control at step S19 the right turn lane mode flag F2=1 and the process moves to step S20 and the detection flag F1 is set to zero.

At step S21, counting up starts for a time (right turn lane mode time period) T1 elapsed since the transition to the right turn lane mode after the right turn lane mode flag F2 is set to one. Then, at step S22, it is determined whether the right turn lane mode time period T1 exceeds a predetermined time period T1S or not, and when the right turn lane mode time period T1 does not exceed the predetermined time period T1S, the process up to this point is repeated. Then, when the right turn lane mode time period T1 exceeds the predetermined time period T1S, the right turn lane mode flag F2 is set to zero at step S23 and the right turn lane mode time period T1 is reset at step S24.

Here, the predetermined time period T1S with respect to the right turn lane mode time period T1 is a time elapsed since the detection of the inclined white line 203 of the right turn lane 102 up to the complete passing of the inclined white line 203 by the vehicle 10. In general, the length of the inclined white line drawn to indicate the additional lane is set to a predetermined length (20 m, for example), and the time required for passing the length is calculated based on a current speed of the vehicle. In other words, while the vehicle 10 is driving from a lane position where the inclined white line 203 of the right turn lane 102 is detected until the vehicle 10 completely passes through the inclined white line 203 after driving a predetermined distance, the information of detected white line is not adopted. After the elapse of this time period and the passing of the inclined white line 203 by the vehicle 10, the right turn lane mode ends and the operation is switched back to the normal lane mode.

At step S25, the road parameters such as the calculated road curvature R, the pitch angle $\phi$ of the vehicle, the yaw angle $\theta$, the lane width W, and offset g, and the state of the detection flag F1 (F1=0 or F1=1) are supplied as outputs to the vehicle steering controller 13. The vehicle steering controller 13, when the detection flag F1=0 is input together with the data of the road parameters, does not adopt the data of the input road parameters and instead adopts the previously supplied data of the road parameters and executes the steering control of the vehicle. Contrarily, when the detection flag F1=1 is simultaneously supplied, the vehicle steering controller 13 adopts the input data of the road parameters as they are to execute the steering control of the vehicle.

Thus, in the boundary detector of the embodiment, the white line candidate line drawn on the road surface is detected based on the image information of the input image from the camera 11 acquired in a predetermined detection time period. The white lines 201 and 202 of the main lane 101 as well as the inclined white line 203 of the right turn lane 102 which is added to the main lane 101 are selected based on the white line candidate line. When the inclined white line 203 of the right turn lane 102 is selected, it is determined that the detection error is made and the right turn lane mode is set. Then, the data of the white line selected as the inclined white line 203 is not adopted for a predetermined time period and the data of white lines 201 and 202 of the main lane 101 which are previously selected is adopted as data of the white line.

Hence, when the detected white line is the inclined white line 203, the detection is determined to be the right turn detection error. Then, the steering control (lane keeping control) based on the detected data is suspended for a predetermined time period, and the steering control (lane keeping control) is maintained based on the data of the white lines 201 and 202 of the main lane 101 which are detected prior to the right turn detection error. The vehicle 10 can properly keep driving on the main lane 101 without being distracted by the right turn lane 102. When a predetermined time period is elapsed since the determination of the right turn detection error, the vehicle passed through the inclined white line 203 of the right turn lane 102, and the white line detection is resumed. Then, the white lines 201 and 202 of the main lane 101 can be detected again for the execution of steering control and for the proper continuous driving of the vehicle 10.

Further, whether the detected white line is the white lines 201 and 202 of the main lane 101 or the inclined white line 203 of the right turn lane 102 is determined based on the road curvature R or the pitch angle $\phi$. Since the road parameters are supplied from the white line detector itself, a separate detector is not necessary, whereby a simple apparatus and control program can be realized. In the foregoing, when the difference between the current road curvature R and the average RA is larger than the first threshold value RB, it is assumed that the current lane makes an excessively large curve to the right or to the left, and the detected white line is determined to be the inclined white line 203 of the right turn lane 102. On the other hand, when the difference between the current pitch angle $\phi$ and the past average $\phi_A$ is larger than the first threshold value $\phi_B$, or the difference between the current pitch angle $\phi$ and the past average $\phi_A$ is smaller than the second threshold value $\phi_S$, the pitch angle is small irrespective of the absence of tilts of the vehicle, and at the same time when the difference between the current road curvature R and the past average RA is larger than the second threshold value RS, the present lane is assumed to make a right curve and the detected white line is determined to be the inclined white line 203 of the right turn lane 102. Thus, the detection error of the white line caused by the right turn can be precisely determined.

Further, the predetermined time period for stopping the steering control based on the detected data after the determination of the right turn detection error is set to a time period required for the vehicle to drive from a lane position where the inclined white line 203 of the right turn lane 102 is detected up to a position ahead the inclined white line 203 after driving the predetermined distance. Hence, when the predetermined time period passes after the detection of the inclined white line 203 of the right turn lane 102, the vehicle 10 can pass the inclined white line 203 to properly detect the white lines 201 and 202 of the main lane 101.

In the embodiment as described above, the time period in which the data of the detected white line is not adopted after the right turn detection error is set to the time period after the detection of the inclined white line 203 of the right turn lane 102 up to the passing of the inclined white line 203. The time period in which the data of the detected white line is not adopted can be set based on a driving distance of the vehicle after the detection of the inclined white line 203 up to the passing of the inclined white line 203. Then, the distance can be measured by a distance meter mounted on the vehicle 10. Further, the time period may be set based not only on the predetermined time period or the driving distance, but on a time period up to the detection of the intersection ahead. Generally, a pedestrian crosswalk, a stop line, a traffic light, a crossover bridge or the like are provided at the intersection. The right turn lane mode may be turned off with the detection thereof with a camera.

In addition, in the above described embodiment, the right turn lane boundary position selecting unit is provided as the right turn lane mode determining unit 26, and two selected white lines are determined to be the inclined white line 203 of the right turn lane 102 based on the calculated road curvature R or the pitch angle $\phi$ of the vehicle. Alternatively, the selected line may be determined to be the inclined white line 203 of the right turn lane 102 when the road curvature R and the pitch angle $\phi$ of the vehicle are larger than respective predetermined values, or based on values corresponding to the road curvature R or the pitch angle $\phi$. In addition, the determination of the right turn lane 102 is not limited to the manner described above. For example, since the inclined white line 203 indicating the right turn lane 102 forms a predetermined bending angle with the white line 202 of the main lane 101, the shape of the inclined white line 203 may be previously stored to be compared with the detected white line. The detected white line may be determined to be the inclined white line 203 of the right turn lane 102 through such manner. Still in addition, when a particular shape of the right turn lane 102 is to be stored, the shape of the right turn white line 204 lead from the inclined white line 203 in the right turn lane 102 may be stored.

Further, the white line detector 12 calculates the road parameters based on the detected white line and outputs the road parameters together with the detection flag F1. The vehicle steering controller 13, on receiving the detection flag F1=0, adopts the previously input road parameters without adopting the road parameters simultaneously supplied with the detection flag, whereas on receiving the detection flag F1=1, adopts the simultaneously supplied road parameters. Such is not a limiting example. For example, when the detected white lines are determined to be the white lines 203 and 204 of the right turn lane 102, the road parameters calculated based on the white lines 201 and 202 of the main lane 101 which are previously calculated may be supplied as outputs, without the calculation of the road parameters or without the output of the calculated road parameters.

Further, in the above described embodiment, a manner of white line detection is described with respect to the bypass highway in which the right turn lane 102 is added to the right of the main lane 101. The white line detector of the present invention, however, is applicable to the highway in which a left turn lane is added to the left of the main lane 101, and the application thereof is not limited to the highways.

As can be seen from the foregoing, the boundary detector according to the present invention stops adopting detected data for a predetermined time period on detecting a boundary position of an additional lane, and is useful for any boundary detector irrespective of the shape of a lane to be detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A boundary detector comprising:
   a camera that is mounted on a vehicle and picks up an image of a road surface;
   a candidate line detecting unit that detects a candidate line of a lane boundary position drawn on the road surface based on image information of the image supplied from the camera;
   a lane boundary position selecting unit that selects the lane boundary position based on the candidate line of the lane boundary position detected by the candidate line detecting unit;
   an additional lane boundary position selecting unit that selects a lane boundary position of an additional lane that is added to a main lane based on the candidate line of the lane boundary position detected by the candidate line detecting unit; and
   a processing unit that stops adopting the lane boundary position selected by one of the lane boundary position selecting unit and the additional lane boundary position selecting unit for a predetermined time period when the additional lane boundary position selecting unit selects a lane boundary position of the additional lane.

2. The boundary detector according to claim 1, wherein the processing unit adopts the lane boundary position prior to the selection of the lane boundary position of the additional lane when the additional lane boundary position selecting unit selects the lane boundary position of the additional lane.

3. The boundary detector according to claim 1, wherein the additional lane boundary position selecting unit recognizes the detected lane boundary position as the lane boundary position of the additional lane one of (i) when a road curvature calculated based on the lane boundary position is larger than a first predetermined value and (ii) when a pitch angle is out of a predetermined range and the road curvature is larger than a second predetermined value smaller than the first predetermined value.

4. The boundary detector according to claim 1, wherein the predetermined time period where it is stopped to adopt the lane boundary position selected by one of the lane boundary position selecting unit and the additional lane boundary position selecting unit is a time period in which the vehicle moves by a predetermined distance from a lane position of the vehicle at a time the additional lane boundary position selecting unit selects the, lane boundary position of the additional lane.

5. The boundary detector according to claim 1, wherein the additional lane is one of a right turn lane to guide the vehicle to turn right and a left turn lane to guide the vehicle to turn left at an intersection ahead along the main lane, and the predetermined time period in which it is stopped to adopt the lane boundary position selected by one of the lane boundary position selecting unit and the additional lane boundary position selecting unit is a time period until the intersection is detected.

6. A boundary detecting method comprising:
   detecting a candidate line of a lane boundary position drawn on a road surface based on image information of an image supplied from a camera that is mounted on a vehicle and that picks up the image of the road surface;
   selecting the lane boundary position based on the candidate line of the detected lane boundary position;
   selecting a lane boundary position of an additional lane that is added to a main lane based on the candidate line of the detected lane boundary position detected; and
   stopping adopting one of the lane boundary positions for a predetermined time period when a lane boundary position of the additional lane is selected.

7. The boundary detecting method according to claim 6, wherein stopping of adapting the lane boundary position includes adopting the lane boundary position prior to the selection of the lane boundary position of the additional lane when the lane boundary position of the additional lane is selected.

8. The boundary detecting method according to claim 6, wherein selecting the lane boundary position of the additional lane includes recognizing the detected lane boundary position as the lane boundary position of the additional lane one of (i) when a road curvature calculated based on the lane boundary position is larger than a first predetermined value and (ii) when a pitch angle is out of a predetermined range and the road curvature is larger than a second predetermined value smaller than the first predetermined value.

9. The boundary detecting method according to claim 6, wherein the predetermined time period where it is stopped to adopt one of the lane boundary positions is a time period in which the vehicle moves by a predetermined distance from a lane position of the vehicle at a time the lane boundary position of the additional lane is selected.

10. The boundary detecting method according to claim 6, wherein the additional lane is one of a right turn lane to guide the vehicle to turn right and a left turn lane to guide the vehicle to turn left at an intersection ahead along the main lane, and the predetermined time period in which it is stopped to adopt one of the lane boundary positions is a time period until the intersection is detected.

* * * * *